United States Patent [19]
Nagata et al.

[11] Patent Number: 5,404,233
[45] Date of Patent: Apr. 4, 1995

[54] METHOD FOR SMOOTHING IMAGE

[75] Inventors: Katsumi Nagata; Taketoshi Kojima; Yasuto Tamada, all of Tokyo, Japan

[73] Assignee: Kyocera Corporation, Kyoto, Japan

[21] Appl. No.: 741,605

[22] Filed: Aug. 7, 1991

[30] Foreign Application Priority Data

| Aug. 28, 1990 | [JP] | Japan | 2-224369 |
| Jun. 29, 1991 | [JP] | Japan | 91120 |
| Jul. 9, 1991 | [JP] | Japan | 91122 |

[51] Int. Cl.$^6$ ............................................. H04N 1/00
[52] U.S. Cl. .................................... 358/447; 358/456; 358/298; 358/296; 358/401; 382/54
[58] Field of Search ............... 358/447, 448, 456, 459, 358/457, 466, 465, 296, 298, 448, 401; 382/54

[56] References Cited

U.S. PATENT DOCUMENTS

| 4,355,337 | 10/1982 | Sekigawa | 358/447 |
| 4,360,883 | 11/1982 | Ejiri et al. | 358/447 |
| 4,437,122 | 3/1984 | Walsh et al. | 358/447 |
| 4,486,785 | 12/1984 | Lasher et al. | 358/447 |
| 4,544,264 | 10/1985 | Bassetti et al. | 358/447 |
| 4,847,641 | 7/1989 | Tung | 346/154 |
| 5,117,294 | 5/1992 | Yano | 358/447 |
| 5,151,794 | 9/1992 | Kumagai | 358/447 |

FOREIGN PATENT DOCUMENTS

| 0388833 | 9/1990 | European Pat. Off. |
| 0393980 | 10/1990 | European Pat. Off. |

Primary Examiner—Edward L. Coles, Sr.
Assistant Examiner—Fan Lee
Attorney, Agent, or Firm—Spensley Horn Jubas & Lubitz

[57] ABSTRACT

A method for forming images composed of a matrix of dots in a printer, such as a laser printer or an LED printer, and a bit map display unit such as a CRT display, and more particularly a method for smoothing images by smoothing stairsteps included in the images to obtain a high resolution image. The method includes dividing a pixel into a plurality of subpixels along a vertical scanning line or a horizontal scanning line, and reversing a signal for a subpixel following a reversion signal to smooth the image as desired. The reversion signal may be provided by subjecting a specific pixel to a boolean operation, conjunction or disjunction, with the adjacent pixels next to the specific pixel. The reversion signal may also be provided by the steps of: generating, in advance, a set of four bordering data which represents the relationship of a specific pixel with bordering pixels, of which bordering data are generated by subjecting the specific pixel and the four bordering pixels to nonequivalent boolean operation respectively, detecting the location of the stairstep and recognizing the style of the stairstep referring to a relationship among the bordering data for the pixels located along the vertical or horizontal line, and measuring the length of the level pixels adjoining with the stairstep.

14 Claims, 19 Drawing Sheets

| | a | b | c | d | e | f | g |
|---|---|---|---|---|---|---|---|
| d0 | 1 | 1 | 1 | 0 | 1 | 0 | 0 |
| d1 | 1 | 1 | 0 | 1 | 1 | 0 | 0 |
| d2 | 1 | 0 | 0 | 1 | 1 | 0 | 0 |
| d3 | 1 | 0 | 1 | 0 | 0 | 0 | 0 |

FIG. 7A (1)

```
        STAIR STEP
      ┌─┬─┬─┬─┐
      :C:C:A:B:
      └─┴─┴─┴─┘
      LEVEL PIXELS
```

|    | C | A | B |
|----|---|---|---|
| d0 | * | 0 | 1 |
| d1 | * | 0 | 1 |
| d2 | 0 | 1 | * |
| d3 | 1 | 1 | * |

(2)

```
      LEVEL PIXELS
      ┌─┬─┬─┬─┐
      :C:C:A:B:
      └─┴─┴─┴─┘
        STAIR STEP
```

|    | C | A | B |
|----|---|---|---|
| d0 | * | 0 | 1 |
| d1 | 1 | 1 | * |
| d2 | 0 | 1 | * |
| d3 | * | 0 | 1 |

(3)

```
      STAIR STEP
      ┌─┬─┬─┬─┐
      :B:A:C:C:
      └─┴─┴─┴─┘
      LEVEL PIXELS
```

|    | B | A | C |
|----|---|---|---|
| d0 | * | 1 | 0 |
| d1 | 1 | 0 | * |
| d2 | 1 | 0 | * |
| d3 | * | 1 | 1 |

(4)

```
      LEVEL PIXELS
      ┌─┬─┬─┬─┐
      :B:A:C:C:
      └─┴─┴─┴─┘
      STAIR STEP
```

|    | B | A | C |
|----|---|---|---|
| d0 | * | 1 | 0 |
| d1 | * | 1 | 1 |
| d2 | 1 | 0 | * |
| d3 | 1 | 0 | * |

FIG. 7B
(5)
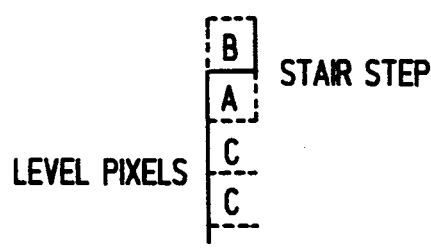
| | d0 | d1 | d2 | d3 |
|---|---|---|---|---|
| B | * | * | 1 | 1 |
| A | 1 | 1 | 0 | 0 |
| C | 1 | 0 | * | * |
(6)
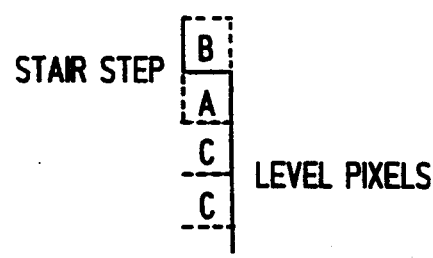
| | d0 | d1 | d2 | d3 |
|---|---|---|---|---|
| B | 1 | * | * | 1 |
| A | 0 | 1 | 1 | 0 |
| C | * | 0 | 1 | * |
(7)
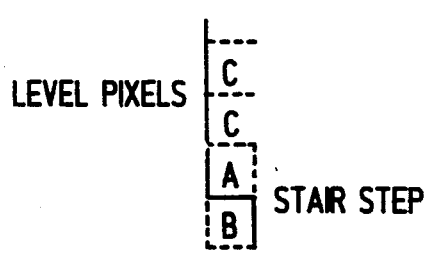
| | d0 | d1 | d2 | d3 |
|---|---|---|---|---|
| C | 1 | * | * | 0 |
| A | 1 | 0 | 0 | 1 |
| B | * | 1 | 1 | * |
(8)
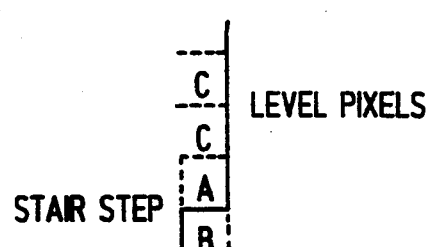
| | d0 | d1 | d2 | d3 |
|---|---|---|---|---|
| C | * | * | 1 | 0 |
| A | 0 | 0 | 1 | 1 |
| B | 1 | 1 | * | * |

FIG. 8
(a)
PIXEL (dot)
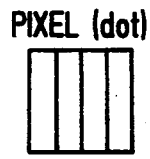
REVERSION DATA TABLE FOR LBP
| STAIR STEP STYLE | REVERSION CODE 1 | 2 |
|---|---|---|
| (1) ~ (4) | | |
| (5), (7) | | |
| (6), (8) | | |
(b)
PIXEL (dot)
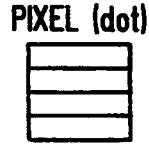
REVERSION DATA TABLE FOR LED
| STAIR STEP STYLE | REVERSION CODE 1 | 2 |
|---|---|---|
| (1), (3) | | |
| (2), (4) | | |
| (5) ~ (8) | | |

FIG. 9A
(A) INPUT VIDEO DATA
(B) BOUNDARY DATA
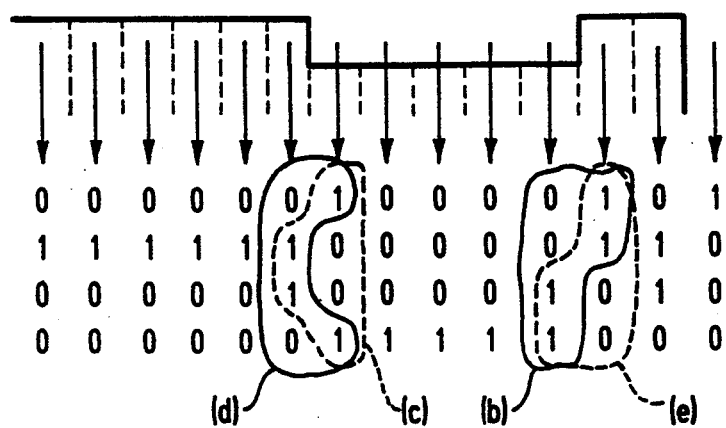
(C) STAIR STEP AND LENGTH OF LEVEL PIXELS
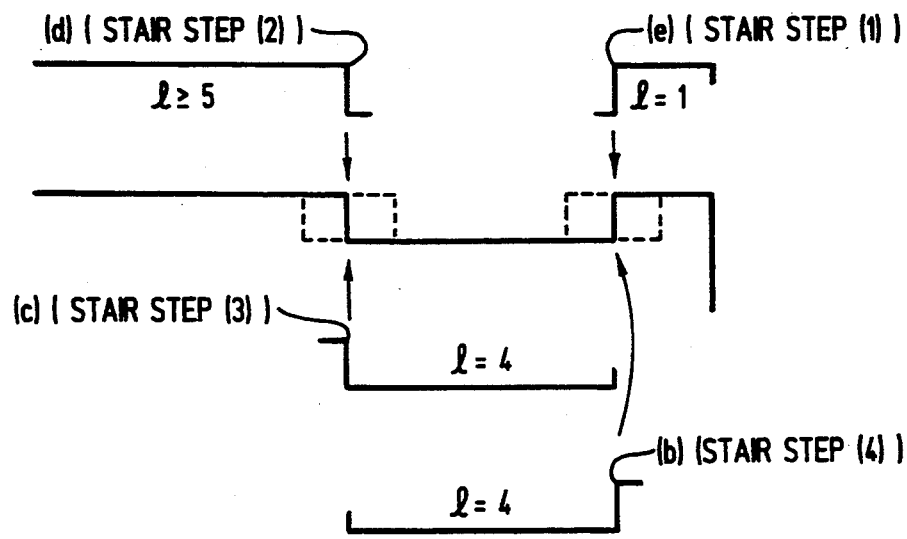

FIG. 9B
(A) REVERSION CODE
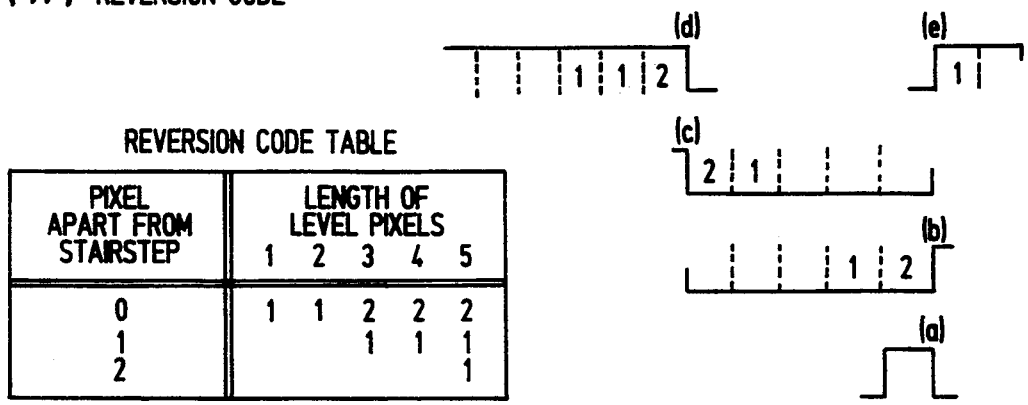
REVERSION CODE TABLE
| PIXEL APART FROM STAIRSTEP | LENGTH OF LEVEL PIXELS | | | | |
|---|---|---|---|---|---|
| | 1 | 2 | 3 | 4 | 5 |
| 0 | 1 | 1 | 2 | 2 | 2 |
| 1 | | | 1 | 1 | 1 |
| 2 | | | | | 1 |
(B) REVERSION DATA
REVERSION DATA TABLE
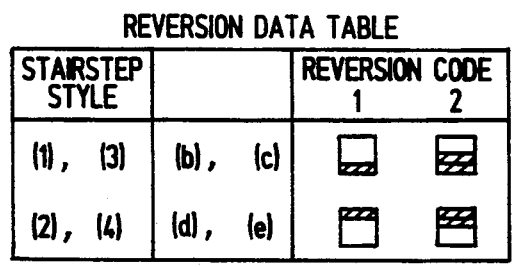
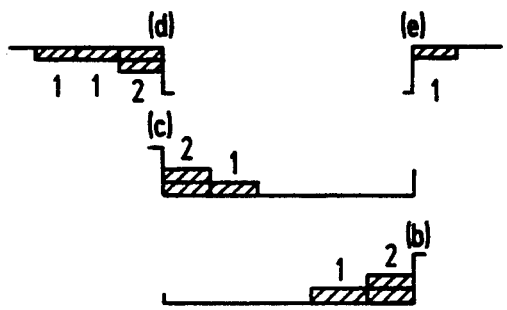
(C) REVERSION OF SUBPIXELS
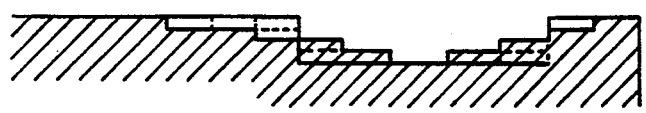

METHOD FOR SMOOTHING IMAGE

BACKGROUND OF THE INVENTION

1. Field of the Invention

This invention relates to a method for forming images composed of dots in a matrix used for a printer, a light emitting diode (LED) printer, or in a bit map display unit such as a cathode ray tube (CRT), and more particularly to improve the images by smoothing stairsteps included in the dot images.

2. Description of the Prior Art

The prior art shows that a laser printer forms a picture element pattern or pixel pattern on a photosensitive drum along its coaxial scanning line in a matrix by scanning repeatedly laser beams modulated with video data sent serially from an image controller.

Other prior art teaches that a dot printer such as an LED printer forms a pixel pattern in a matrix on a recording member, a photosensitive drum for example, moving relatively vertically, by means for forming pixels such as an LED disposed along the coaxial scanning line, which is controlled to emit simultaneously in the full line or successively in block after block.

In either printer, the pixels are arrayed in an n×m matrix to form characters or pictures. Letters such as O and V consisting of curves or diagonals, therefore, are formed with stairstep edges which damage the quality of the picture.

To overcome the defects, in the laser printers which form pixel patterns by scanning the modulated laser beams along the scanning line, attempts for smoothing the stairsteps are disclosed to form a smaller dot size by reducing the output energy for the pixels at the diagonal edges (Laid Open Pat. Appln. 60-139072); or to modulate so as to narrow the width of the output laser beams and to print small dots within the normal dot area.

In the LED printers, on the other hand, arrayed with the diodes in a line, the diodes are disposed with a fixed distance along the scanning line. The LED's, further, are arranged in a modular tip with n units of diodes which results in control of the scanning line with the n units or the full line. It is, therefore in the LED printers, hard to adopt the above techniques which change the dot size and shift the smaller dots.

In an LED printer, therefore, which outputs a video image with a line unit, a technique for smoothing stairstep edges is constituted by a method for arranging pixels so that each pixel shifts in every scanning line within a suitable distance to dispose the pixels diagonally along the vertical scanning line (Pat. Publn. 62-24987).

In the prior technique, however, as the pixels shift in the full scanning line, it is hard not only to obtain a smoothed character, but also to absorb a steep stairstep even if the elements are arranged by logical adjunction.

To overcome the defects above, a technique is disclosed to replace the pixel in question with narrower pixels which are made coordinately narrower either along the horizontal scanning line or the vertical scanning line (Laid Open Pat. Appln. 2-112966).

In the prior technique, the replacement of the specific pixel in question is made on the basis of a reference pixel pattern having four compensation subcells which are narrower in a coordinate direction. The prior technique, in the LED printer, is able to provide narrower dots in the vertical direction by controlling the emitting time of the LED array. Because the LED is disposed in a fixed distance, the pixel has to be controlled the light intensity to make the pixel narrower in the scanning direction. As described above, because the LED's are combined in a tip with a plurality of diodes, it is substantially hard to control the light intensity of individual diodes.

U.S. Pat. No. 4,437,122 shows a 3×3 matrix of subpixels, referring the surrounding pixels. The technique is hard to adopt in LED printers, because an LED can not be divided along the scanning line. Further, the center pixel has to be referred with eight surrounding pixels, and to be matched with the 3×3 subpixel combinations, that is, 20 subpixel patterns including their rotation which results in preparing a sophisticated circuit, and in a prolonged processing time. Thus, the technique does not satisfy the needs for faster processing.

Each of the prior techniques consists of the steps of, firstly appointing the central pixel in question, secondly comparing the configuration of n×m neighboring pixels with many templates prepared in advance, and lastly smoothing the central pixel according to the template pattern matched. To compare the configuration of the neighboring pixels means that one has to prepare many templates corresponding to the combinations in the n×m matrix. Further, there is a meaningful stairstep to figure such corner as in letters E and F, which corner must be kept sharp. To achieve the effective smoothing and not to smooth the meaningful stairsteps, one has to prepare other templates for the stairsteps not to be subjected to the procedures which results in providing another memory for the meaningful stairsteps, and in constructing more sophisticated circuits. The large scale of the circuit and the large amount of work for matching delay the process and thus fail to satisfy the requirement for faster processing.

SUMMARY OF THE INVENTION

Considering the defects of prior techniques, it is an object of the present invention to provide an image smoothing method which can smooth images easily and accurately without a sophisticated circuit, and with a simple processing.

It is a further object of the present invention to provide an image smoothing method which is able to smooth images, and also to improve pixels acceptable for enlargement of the smoothed data with enhanced resolution.

It is a further object of the present invention to provide an image smoothing method which is able to accomplish the objects, usable with a linear dot printer such as an LED printer.

To achieve the objects, the method according to the invention includes dividing each pixel into P subpixels in one scanning direction following the teachings of Pat. Publn. 62-26626, Laid Open Pat Appln. 60-134660 and so forth, and further, providing a subpixel for each subpixel, either an "on" signal or an "off" signal. An "on" signal is a signal which produces a dot, or black pixel. An "off" signal is a signal which leaves a blank, unprinted, pixel area, and a video signal encompasses both on and off signals. Switching between on and off signal values is referred to as reversing the signal.

The present invention will be described in detail referring to attached drawings.

The first embodiment illustrated in FIGS. 1 and 2, is a method for smoothing an image by the subpixel method for a line dot printer, an LED printer for example, of which picture elements are arrayed along the scanning line.

According to the invention, a pixel is constituted by a number of subpixels P=3 or more, preferably 5, as shown in FIG. 1, either prior to or without image smoothing, in which a smaller number N (N<P) of subpixels are serially generated by subpixel signals to form the pixel for the full line or a unit of n bits to be output; and in the stage of image smoothing, the subpixel signals are applied not only to said subpixels, but also to other pixel or pixels to reverse its signal(s) referring the specific pixel in question with the preceding and succeeding pixels to form the output pixel.

The smoothing procedure, as shown in FIG. 1, is made by reversing the subpixel signal(s) so that the black pixel(s) seemingly may be added or reduced vertically within the specific pixel; or as shown in FIG. 2(a), so that the black pixels seemingly may be shifted vertically to the next pixels located on the preceding or succeeding lines, or beyond the specific pixel; or as shown in FIG. 2(b), so that the black pixel(s) seemingly may be reduced vertically within the specific pixel, or may be enlarged so that the pixel(s) seemingly shift to the next pixel to form a bold pattern.

The smoothing procedure, as shown in FIGS. 1 and 2, comprises the following steps. Supposing the printer outputs a pixel with 5 subpixels P1 through P5 divided vertically as seen in FIG. 1(a), the normal pixel b2 consists of 3 subpixels in the middle as a black dot, the upper and bottom subpixels remaining as blank or white pixels. The 3 subpixels among 5 subpixels will be supplied with on subpixel signals, and be considered as a 100% intensity pixel.

To achieve image smoothing following the pixel information next to the specific pixel, the signals for subpixels P1 and P4 may be reversed to shift seemingly the black dot close to the preceding pixel as in b1, or subpixels P2 and P5 may be reversed to shift seemingly the black dot close to the succeeding pixel as in b3. Thus, 3 dot patterns, b1, b2 and b3, are available. If the reversion of subpixel P2 alone, or subpixels P2 and P4 takes place, reduced pixels of b4 (67% intensity) and b5 (33% intensity) are obtainable.

The arrangement of subpixels b1 through b5 allows to print enhanced characters with a smoothed stairsteps for diagonal or curved lines. When printing the letter X, for example, it is possible to avoid a bold intersection point if the pixel b4 (67% intensity) is chosen for that point.

The instance above shows an example where P is taken as 5, and N is taken as 3 which provides vacant subpixels at the top and bottom. The vacant subpixels allow the image smoothing procedure with reversion. The vacant subpixels, on the other hand, make the pixel thin when the pixel does not need to be subjected to the image smoothing. Further, the vacant subpixels provide a clearance with preceding and succeeding pixels, which clearance prohibits printing all over a certain area. The clearance, in some cases, makes the pixels vertically apart, and makes characters coarse which may interfere with image smoothing.

In the events above, the reversion of subpixels may not be limited to within a single pixel, but may be extended to the pixels adjoining vertically to the specific pixel as shown in FIG. 2(a). Up to two bottom subpixels of a pixel above a subject pixel may be reversed to seemingly extend across the pixel boundary (b6), or up to two upper subpixels of a pixel below the subject pixel may be reversed to seemingly extend across the pixel boundary (b12), while other 4 pixels (b6, b7, b11 and b12) provide a dense and fine image smoothing.

Further, it is worthwhile to expand, by reversing any subpixel(s) of the pixels above, the pixels up to 35 patterns in all including such patterns as 33% dots (b13, b14), 67% dots (b15, b16), 100% dots (b17 or b6, b18), 133% dots (b19, b20), and 167% dots b21, b22).

FIGS. 3 through 5 show specific procedures for image smoothing for the apparatus which adopts the reversion process described above.

According to these procedures, a specific pixel next to a boundary where a pixel changing white to black, or black to white along a desired scanning line, and the reference pixels next the specific pixel on the preceding or succeeding scanning line are subjected to boolean operations, conjunction and disjunction, to smooth the specific pixel, the reference pixel(s) and pixel(s) adjacent thereto.

The specific pixel next to the boundary, therefore, is not limited to the black pixel;, but also includes the white pixel.

The present invention also includes the case that the number of subpixels P in a pixel is equal to the number of the normal subpixels N in the subpixels P, and the case previously described that N<P as well.

FIG. 3 shows a procedure for replacing black pixel(s); in which FIG. 3(a) shows a stairstep to be smoothed, and FIG. 3(b) shows the smoothing result. The specific pixel A is detected where a series of white pixels (0) have switched to black pixels (1), i.e. the pixels to the left of A are blank. The specific pixel A is subjected to conjunction operation with reference pixels E and F next to the specific pixel A and located on a preceding or succeeding scanning line to assign subpixels *1 and *2 to be reversed. A subpixel *1' is produced simultaneously with the subpixel *1.

Following the steps above, the specific pixel F is detected where a series of black pixels (1) turn to a white pixel (0). The specific pixel F is subjected to conjunction operation with the reference pixels A and G next to the specific pixel F located on a preceding or succeeding scanning line to decide subpixels *3 and (4 to be reversed. A subpixel *4, is produced simultaneously with the subpixel *4. The boolean operation is described as follows:

*1:A (0→1) ∧ E ∧ F
*2:A (0→1) ∧ E ∧ F
*3:F (1→0) ∧ A ∧ G
*4:F (1→0) ∧ A ∧ G

FIG. 4 shows a second procedure of the present invention; in which FIG. 4(a) for stairsteps to be smoothed, and FIG. 4(b) smoothed pixels. Following the steps above, the specific pixels A and A; are detected where a series of white pixels (0) turn to a black pixel (1). The specific pixels A and A' are subjected conjunction operation with the reference pixels B and B' next to the specific pixel A and A' and located on a preceding or succeeding scanning line to assign subpixels *2 to be reversed.

Correspondingly, the specific pixels B and B' are detected where a series of black pixels (1) turn to a white pixel (0). The specific pixels B and B' are subjected conjunction operation with the reference pixels A, A' and D next to the specific pixels B and B' located at a preceding, succeeding or the same scanning line to assign subpixels *3 to be reversed from black to white subpixels. The boolean operation is described as follows:

*1: A, A'(0→1) ∧ B
*2: B, B'(1→0) ∧ A (A')
*3: B, B'(1→0) ∧ D (A) ∧ A (A')

FIG. 5 further, shows another procedure of the present invention which reverses subpixels $a_2$ to $g_2$ located at subpixel lines P13 and P14 of the lower subpixels on the same scanning line I, and subpixels located at subpixel lines P21 and P22 of the upper subpixels on the succeeding scanning line II.

The specific pixel A is detected where a series of white pixels (0) turn to a black pixel (1) on the same scanning line I. The specific pixel A is subjected to conjunction operation with the reference pixels E and F next to the specific pixel A located on the succeeding scanning line II. The specific pixel C is detected where a series of black pixels (1) turn to a white pixel (0) on the same scanning line I. The specific pixel C is subjected to conjunction operation with the reference pixels G and H next to the specific pixel C located at succeeding scanning line II to provide subpixels to be reversed, preceding subpixel b1 and succeeding subpixel b2 on the subpixel line P13, and 2 bits of subpixels on the line P14, preceding subpixels a1 and a2, and succeeding subpixels g1 and g2.

Similarly, the specific pixels F and G are detected on the succeeding scanning line II. The specific pixels F and G are subjected to conjunction operation with the reference pixels A, B, and B, C respectively next to the specific pixels F and G located on the scanning line I to provide subpixels to be reversed, one each bit of subpixels d and f at the subpixel line P22, 2 each bits of subpixels C, c/e, and c/e, g at the subpixel line P21 respectively. Since the subpixels c and e overlap, they are subjected to a disjunction operation (OR) for reversion.

Following the present invention, firstly, a specific pixel is detected, where a series of white (black) pixels turn to a black (white) pixel on the scanning line, and, secondly, is subjected to a boolean operation, conjunction or disjunction, with reference pixels next to the specific pixel located at a preceding or succeeding scanning line to produce subpixel(s) to be reversed. Thus, the image smoothing is achieved easily with a simple boolean operation under simple instructions, to provide higher resolution. The reversion process is effective especially for LED printers having a writing head arrayed in a line.

A third procedure of the present invention is shown in FIGS. 6 through 9B for smoothing an image providing boundary data which specify the relationship between every pixel and pixels having a common boundary.

According to the prior techniques described above, a specific pixel is smoothed by matching the n×m neighboring pixels with a number of patterns prepared in advance. The first and second procedures of the present invention detect the specific pixel, and then the specific pixel is subjected to the boolean operation, conjunction or disjunction, to reverse subpixels for smoothing.

In the procedure of the present invention shown in FIGS. 6 through 9B, m the reversion process is similar to the prior techniques and the first and second procedures of the present invention; firstly, to provide the bordering data which specify the relationship with four pixels having a common horizontal or vertical boundary (called as bordering pixels, hereinafter) for all pixels forming the image pattern; secondly, to recognize the location and style of stairstep subjecting to boolean operation with bordering data to find out a certain relationship; thirdly, to count length of level pixels; and finally, to smooth the pixels by reversing the subpixels using those data.

This procedure of the present invention is quite novel for the image smoothing which provides the bordering data for every pixel specifying the relationship with bordering pixels, without firstly identifying the specific pixel nor the reference pixels.

It is preferable but not to be limited for providing the bordering data, that is, all pixels forming the image pattern are subjected to nonequivalence operation, or exclusive-OR, with the four bordering pixels next to the specific pixel horizontally and vertically, obtaining four bits of binary data for every pixel.

It is, further, preferable but not to be limited for recognizing the stairstep that a pair of bordering data of adjoining pixels located on the horizontal or vertical line with a common boundary are extracted to verify if there is a stairstep between the pixels, or whether or not three equations described below are satisfied, and if so, classify what style of the stairstep to be modified.

It is, further, preferable for detection of subpixels to be reversed that the length of level pixels is counted for selecting a reversion code specifying which of the subpixel(s) is reversed. The reversion code table shows that the reversion code, 1 or 2, is apportioned for each pixel apart from the stairstep, and for each stairsteps having the length of level pixels. The reversion code table offers a simpler circuit for faster processing with higher accuracy.

This procedure of the invention will be described as follows:

1) Generating Bordering Data

The pixels on the (n−1)th, (n)th and (n+1) lines, as shown in FIG. 6(a), are shifted to be read one after the other. As shown in FIG. 6(b), a specific pixel $B_n$, for example, is subjected to nonequivalent or exclusive -OR (E-OR for short) operation with the bordering pixels, $A_n$, $B_{n-1}$, $C_n$ and $B_{n+1}$, having a common vertical or horizontal border line with the pixel $B_n$, which generate 4 bits of binary values denoted as d0, d2, d2, and d3.

The boolean values, d0, d1, d2, d3, will be generated for all pixels, a through g, for example as shown in FIG. 6(c). The E-OR boolean value takes "1" if the two operands (pixels) differs each other (white-black, or black-white pixels), otherwise, takes "0" for the same operands (white-white, or black-black pixels).

It is notable, therefore, that it makes no difference if a pixel is a dot or blank, but the value tells the relationship between the pixels. Taking f and g as an example, though the pixels are of different colors, white for f, and black for g, the values, d0, d1, d2, d3, for the pixels are the same (0, 0, 0, 0), because each pixel f or g has the same value as its respective bordering pixels. That is, the value tells us the relationship with bordering pixels.

2) Detecting the Stairstep and Recognizing the Style

To detect stairstep, at least three sets of the bordering data for the adjoining pixels on a horizontal or vertical line are extracted and tested to determine if the data satisfy the Eqs. 1) through 3). If so, a determination is made of the type of stairstep represented by the data. The types of stairsteps to be recognized are illustrated in FIGS. 7A and 7B, types (1) to (4), and (5) to (8), respectively.

The boolean value, d0 through d3, for the pixels beyond the concerned pixel line, for the pixels on (n__1 or n—2)th line for example, are not extracted for the stairstep detection. Because the relationship with the adjoining pixels on the same line is concerned to detect the stairstep, and because the verification of the bordering data of pixels on the concerned line results in considering the states of pixels on three lines which is included upper and lower lines, the bordering data for one line, therefore, are enough to detected the stairstep.

As this procedure of the present invention generates firstly the bordering data as for the relationship with the bordering pixels, and detects the stairstep together with its type by the relationship in the bordering data of adjoining pixels on the same horizontal or vertical line, the present invention is able to smooth the images with a simpler circuit, faster processing, and higher resolution than the prior techniques which must match the n×m matrix data with a number of patterns.

The boolean operation for detecting the stairstep is, firstly, performed to extract a pair of bordering data for the pixels adjoining horizontally or vertically, denoted $d0A, \ldots, d3A$ and $d0B, \ldots, d3B$, and assuming that $(\alpha, \beta)$ is any one of the combinations (0, 1), (1, 2), (2, 3) and (3, 0), if $(d\alpha A, d\alpha B) = (d\beta A, d\beta B) = (0, 1), \ldots$ Equ. 1) and assuming $\tau$ or $\delta$ are any other numerals designating the bordering data for the pixel A taken in Equation 1), $d\tau A = d\delta A = 1. \ldots$ Equ. 2)

Secondly, the operation is subjected to extract the bordering data for the pixel C, which is opposite to the pixel B next to the pixel A, and assuming $\tau$ or $\delta$ are any other numerals taken in the Equation 1), and to see if $(d\tau C, d\delta C) = (1, 0)$ or $(0, 1). \ldots$ Equ. 3)

If the relationship among the bordering data for the three pixels, A, B, and C, satisfy simultaneously at least the three equations, Equs. 1,), 2) and 3), the boundary between A and B is deciphered as the stairstep.

In the case of letter E or F, therefore, two or more adjacent dots form rectangular pattern which will not be erroneously recognized as a stairstep.

Further, as seen in FIG. 9B (A), the stairstep (a) is not deemed a stairstep,, because there is no level pixel succeeding the stairstep. The stairstep (a), therefore, will not be subjected to the smoothing procedure.

Therefore, there is no need to consider beyond the types as shown in FIGS. 7A and 7B, which will be four types for each direction of horizontal and vertical ways, totaling eight types. The detecting and the recognizing procedures are so simple to subject four bits of binary values of the bordering data for the adjoining pixels to analyze relationship therebetween by the boolean operation that the procedures are able to be treated with a simple circuit and processing without worrying about the color of the pixels, white or black, without handling in a block unit as is done in the prior techniques.

3) Assigning Reversion Code

The length of level pixels is counted. One of the reversion codes, 1 or 2, as show in FIG. 9B (A), is assigned for each pixels referring to the distance from the stairstep, and the length of level pixels.

To count the length, as shown in FIG. 9B (A), the level pixels succeeding or preceding the stairstep are counted. The pixel at the stairstep is not included in the length. The length for the stairstep (e): L=1; for the stairsteps (c) and (b): L=4; for the stairstep (d): L>5; and the stairstep (a): L=0 which is not subjected to the smoothing procedure.

Referring to the reversion code table shown in FIG. 9B (A), for the stairstep (d) of which the length of level pixel is more than five, the reversion code for the pixel at the stairstep for which the distance from the stairstep is zero is assigned as 2, and the reversion code for the pixels located at the distance 1 pixel and 2 pixels from the stairstep are respectively assigned as 1.

4) Assigning of Subpixel(s) to be Reversed

Referring to the reversion data table (a) for a laser beam printer (LBP in short), and table (b) for LED shown in FIG. 9, reversion data is selected as per the stairstep type and the reversion code.

The reason why the tables are provided is to collect the cases as per the reversion data, without generating the reversion data for each stairstep type and reversion code, to make the circuit simple.

The reversion data illustrates which subpixel(s) will be reversed. The LBP, which is able to divide the beam along the scanning line, takes the reversion data of which subpixels are divided vertically as shown on Table (a) o FIG. 8. The horizontal stairstep types (1) through (4) will be collected in a category for each reversion code, 1 and 2. And vertical stairstep types (5), (7) and (6), (8) will be collected in other categories for each reversion code. The table (a) illustrates six reversion data for three categories of stairstep types, and for each reversion code. The hatched subpixel(s) are the subpixel(s) to be reversed.

The reversion data table (b) is prepared for an LED printer in which a pixel can be divided into horizontal subpixels along the vertical scanning line. The eight types of the stairsteps drop in three categories for each reversion codes, totaling sic reversion data, as well.

The tables show that in the stairstep types (1) or (3) for the LED printer, for example, if the pixel is assigned the reversion code as 1, the bottom subpixel of the pixel will be reversed, and if the code as 2, the lower two subpixels will be reversed, and so forth.

5) Reversion of Subpixel

Following the signal obtained by the reversion data table, the subpixel(s) of the pixel are reversed to form the output video data.

In the LED printer, for example, which output the image repeatedly in four times for a pixel according to the video data, it is quite enough to reverse the subpixels corresponding to the reversion data just before delivering the video data to the printer, which results in achieving smoothing with a simple smoothing circuit, and in a shorter processing time than with known, complex circuits.

BRIEF DESCRIPTION OF THE DRAWINGS

FIGS. 3 through 5 are explanatory views for describing the second image smoothing procedure of the present invention, in which FIG. 3 illustrates the procedure reversing especially subpixel(s) of white pixel alone; FIG. 4 illustrates the procedure reversing subpixel(s) of both white and black pixels; and FIG. 5 illustrates another modified procedure reversing up to subpixel(s) next to the specific pixel.

FIGS. 6 through 9B are explanatory views for describing the third procedure of the present invention; in which FIG. 6 illustrates the procedure to generate bordering data and those examples; FIG. 7A illustrates styles of horizontal stairsteps and those bordering data; FIG. 7B illustrates styles of vertical stairsteps and those bordering data; and FIG. 8 illustrates reversion data tables for the pixels divided vertical or horizontal subpixels, respectively. FIGS. 9A and 9B are views for describing a practical procedure of the present invention applied for an LED printer; in which FIG. 9A illustrates to specify the style of stairstep, and to count length of level pixels; and FIG. 9B illustrates to apportion the reversion code to respective pixels according to the style of stairstep and the length of level pixels referring to a reversion code table, and of which subpixels of stairstep image are reversed to smooth the stairsteps.

FIG. 10 and 11 are explanatory views for describing an LED printer applied the present invention; in which FIG. 10 illustrates a circuit block diagram of the printer head of LED printer; and FIG. 11 illustrates the output pixels formed by the circuit.

FIGS. 13 and 14 are illustrations describing circuit block diagrams for the second image smoothing procedure; in which FIG. 13 illustrates the whole circuit block diagram; and FIG. 14 illustrates detailed circuit block diagram for apportioning the reversion data, and reversion of the subpixels.

FIGS. 15 through 17 are illustrations describing circuit block diagrams for the third image smoothing procedure; among which FIG. 15 illustrates the whole circuit block diagram; FIG. 16 illustrates a detailed circuit block diagram for generating the bordering data; and FIG. 17 illustrates detailed circuit block diagrams for boolean logic unit.

DETAILED DESCRIPTION OF THE PREFERRED EMBODIMENTS

A preferred embodiment of the present invention will be described in detail with reference to the accompanying drawings. The sizes, materials, shapes, and relative arrangement of respective parts of the embodiment described herein are only descriptive examples and are not intended to restrict the scope of the present invention, unless otherwise noted.

Figure 10:
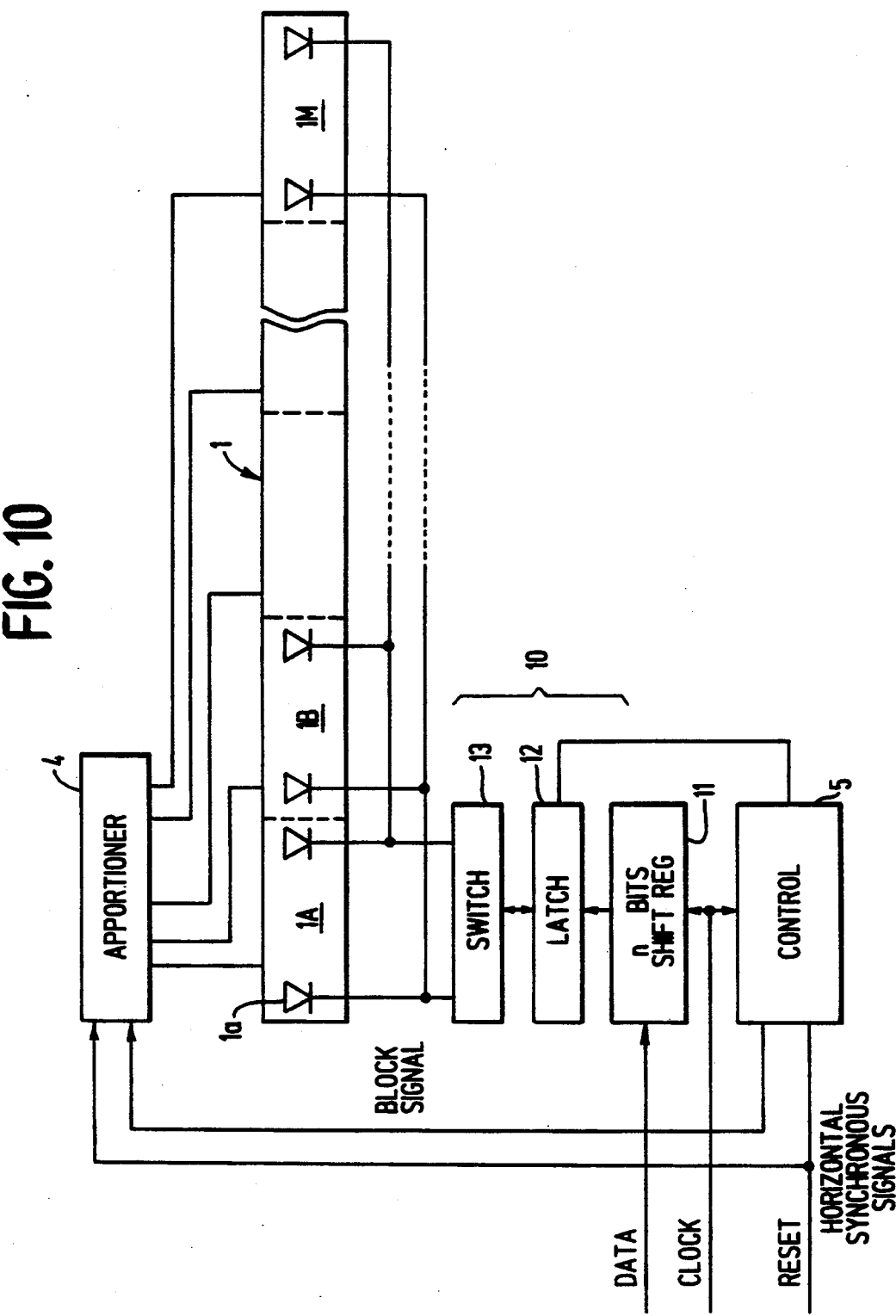

FIG. 10 is an explanatory view illustrating a circuit block diagram of the printer head of an LED printer for implementing the present invention, in which the circuit receives n bits of pixels of images to be delivered sequentially in time multiplex to the LED head elements; reference numeral 1 denotes an LED array composed of a plurality of LED tips 1A, 1B, . . . , 1M arranged in a line. Each tip consists of n bits of LED elements 1a, numeral 10 denotes driving integrated circuits (IC's) for the LED array 1, which driving IC's include a shift register 11 having a storage capacity corresponding to the number of LED elements n bits, a latch 12, and a switch 13 having switch elements corresponded to the number of LED elements n bits, wherein switch elements and the LED elements are connected with a printed wiring in a matrix formation.

Reference numeral 4 denotes a block apportioner which shifts sequentially the connection between the switch 13 and the LED tips 1A, . . . , 1M on receiving every n bits of pixel data in the shift register 11.

Figure 12A:
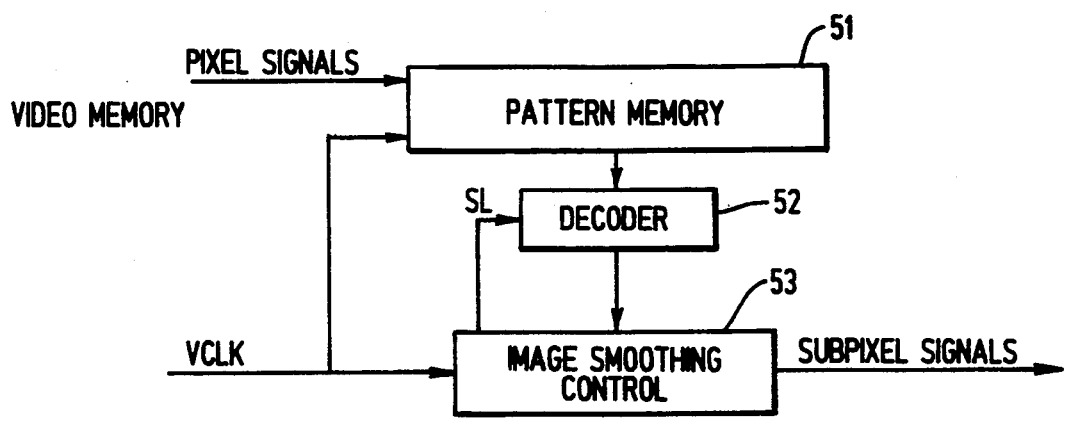
FIG. 12 is an illustration describing a circuit block diagram for the first image smoothing procedure.

During operation of the circuit, firstly, the shift register 11 receives and stores serially the first n bits of video data of the pixels from an image smoothing control 53 (FIGS. 12(a)) on receiving a clock signal, upon receiving a latch signal from a control 5, the latch 12 receives and holds the n bits pixel data signals in parallel, and then transfers the signals to the switch 13 for delivery to the LED elements 1a of the LED tip 1A.

Secondly, the shift register 11 receives and stores the second n bits pixel data following to transfer of the first data bits to the latch 12, the latch 12 receives the second n bits data upon receiving the latch signal from the control 5, and a block signal is sent from the control 5 to the block apportioner 4 to indicate that the latch 12 is ready to transfer to the switch 13, and the block apportioner 4, then, shifts the connection to the next LED tip 1B to emit.

The circuit, thus, outputs pixel data repeatedly m times up to the LED tip 1M to cover the full length of a scanning line.

Figure 11:
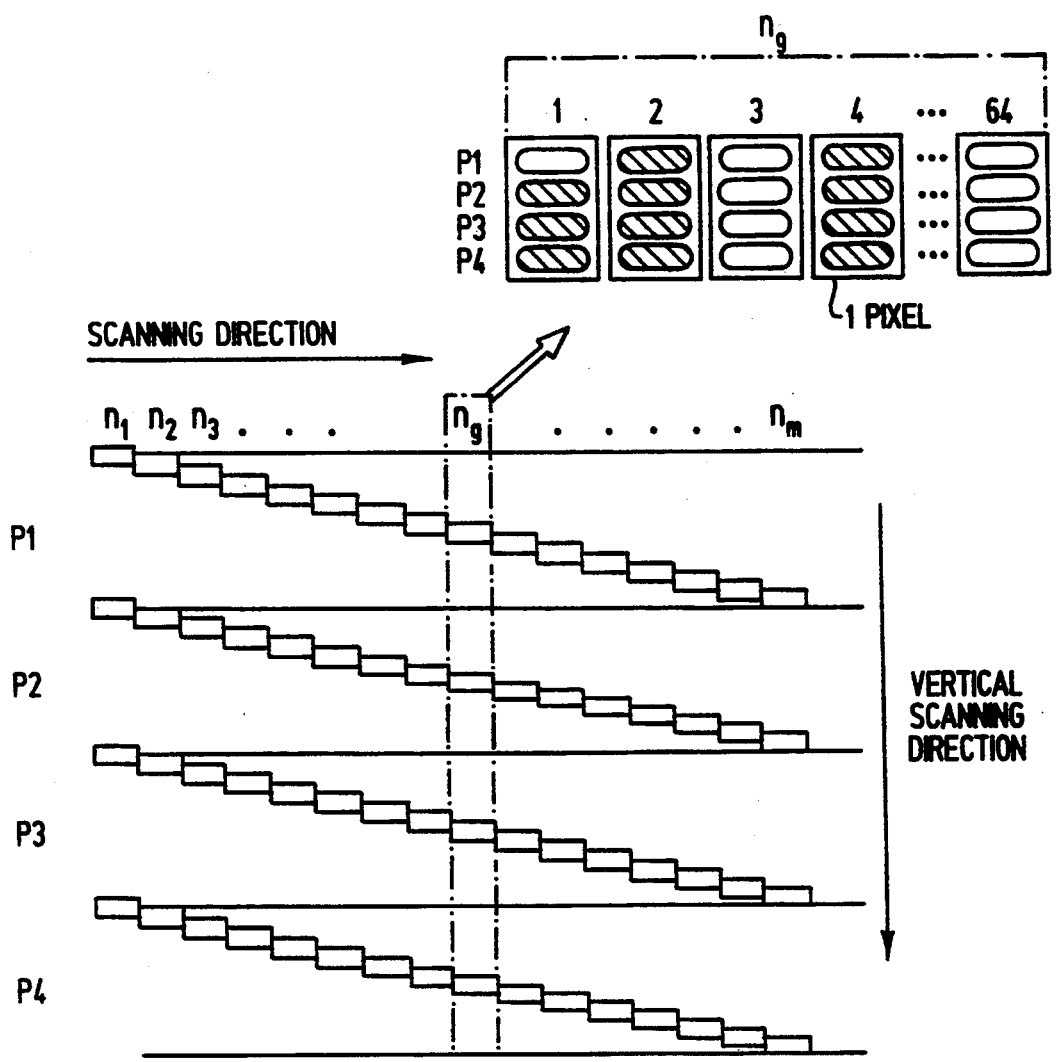

In the same manner, the circuit controls each of LED tips 1A, . . . , 1M (m×4) or (m×5) times for the scanning line divided into 4 or 5 subpixels to develop the image as shown in FIG. 11.

Figure 12B:
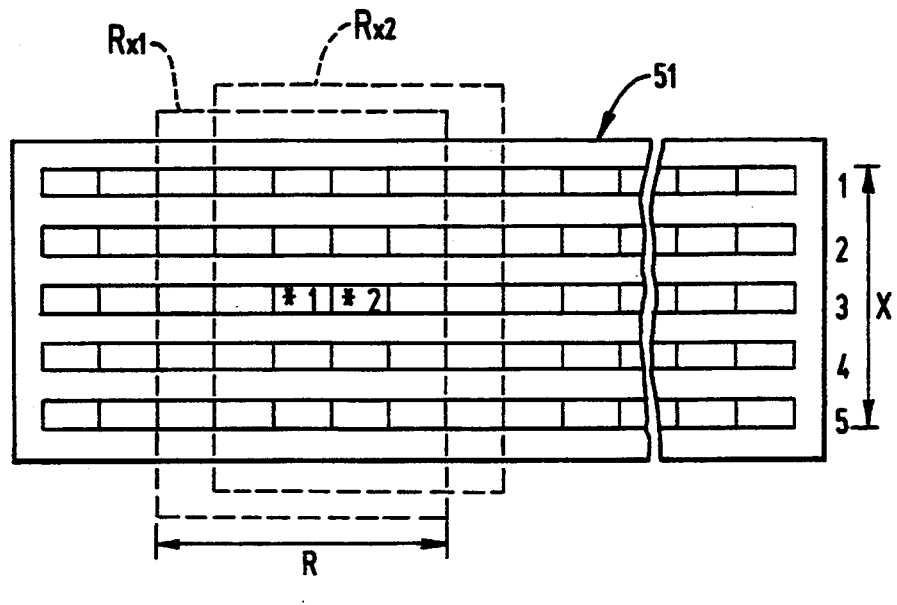

FIG. 12 is an illustration describing a circuit block diagram for the first image smoothing procedure. The circuit is connected with an output terminal of a video memory (not illustrated) which stores the unfolded image data, and is constituted to receive the video data for a plurality of scanning lines from the video memory, to subject the video data to smoothing stairsteps, and to send the data to the shift register 11 of the LED heat circuit shown in FIG. 10.

The circuit consists of a pattern memory 51, a decoder 52, and an image smoothing control 53.

The pattern memory 51 receives serially the unfolded video data for the scanning line on receiving a video clock signal, and stores the specific video data ready for transferring to the shift register 11 together with the video data for preceding and succeeding scanning line(s).

The decoder 52 includes a boolean operation unit. The video data in the pattern memory 51 adjacent to the specific pixel, or more particularly, in a matrix RX1 consisting of R pixels in the horizontal scanning direction and X pixels in the vertical scanning direction, are subjected to logical conjunction on receipt of the SL signal from the control 53; and some of the subpixels are reversed as desired to form the output subpixel data.

The smoothed data subjected to the reversion procedure are transferred upon receiving the standard clock signal to the n bits shift register 11 of the LED head circuit shown in FIG. 10.

In every transferring of the subpixel data to the shift register 11, the decoder 52 on receipt of the standard clock signal subjects the subpixel data in the pattern memory 51 to reversal as desired to smooth the image, shifting the RXn matrix sequentially one after the other, while shifting the specific subpixels *1, *2, . . . , *n.

Figure 1B:
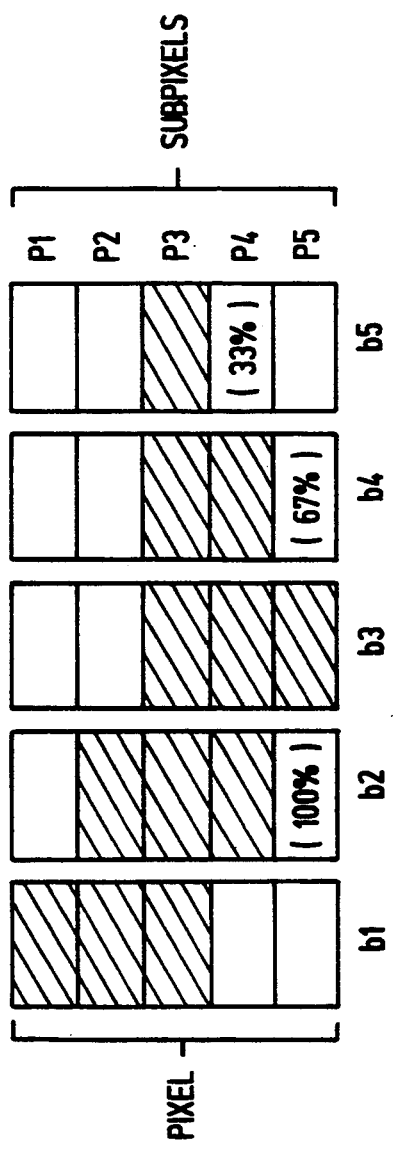
FIGS. 1 and 2 are explanatory views for describing the first image smoothing procedure of the present invention, in which FIGS. 1(A) and (b) illustrates the basic concept of the procedure.
Figure 1A:
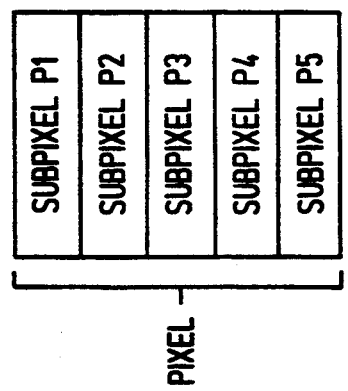
Figure 2A:
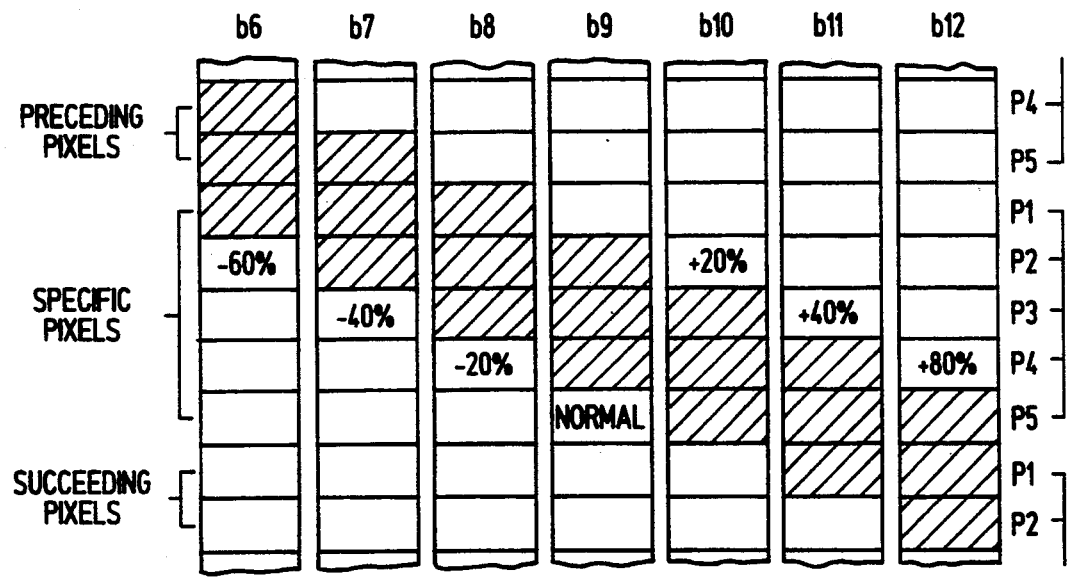
FIG. 2(a) and (b) illustrate another modified procedure, that the reversion is made up to subpixel(s) next to the specific pixel to be seemingly shifted.
Figure 2B:
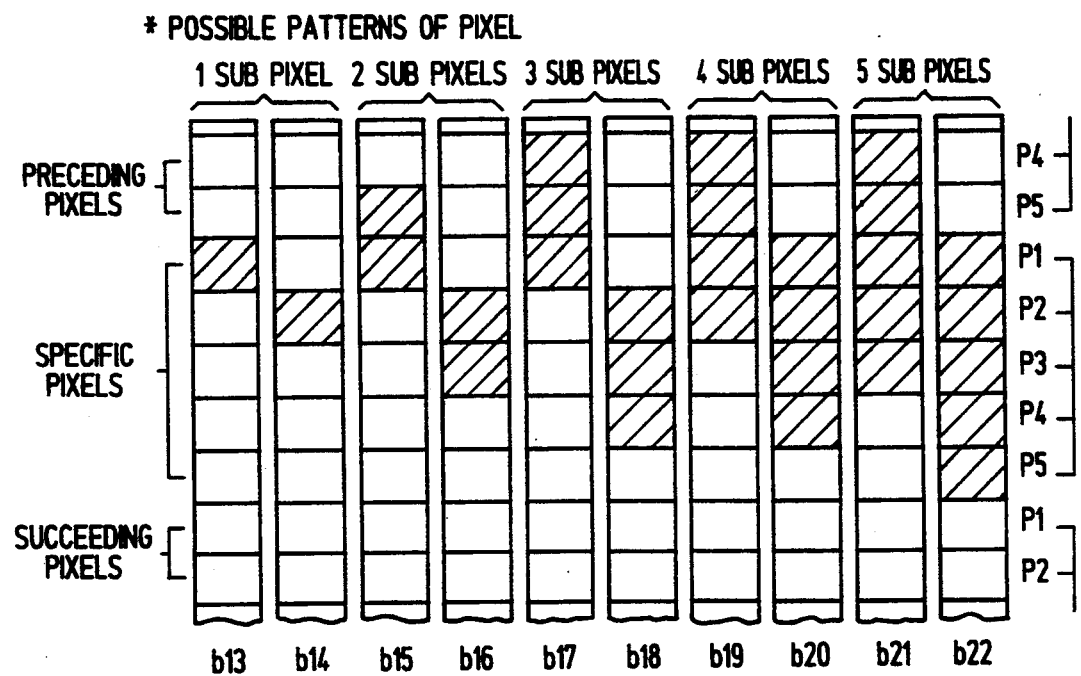
Figure 3A:
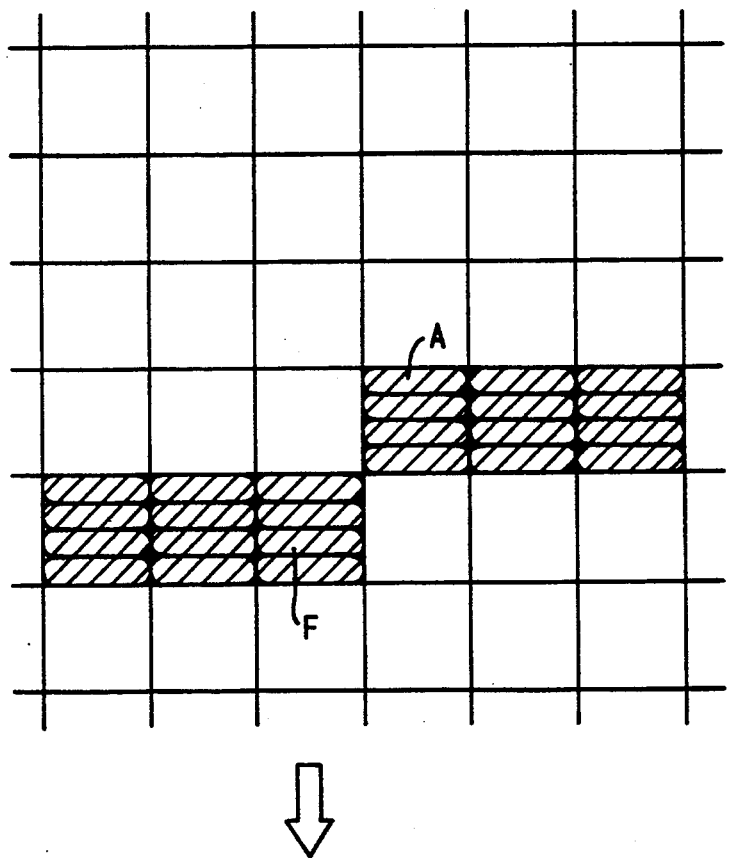
Figure 3B:
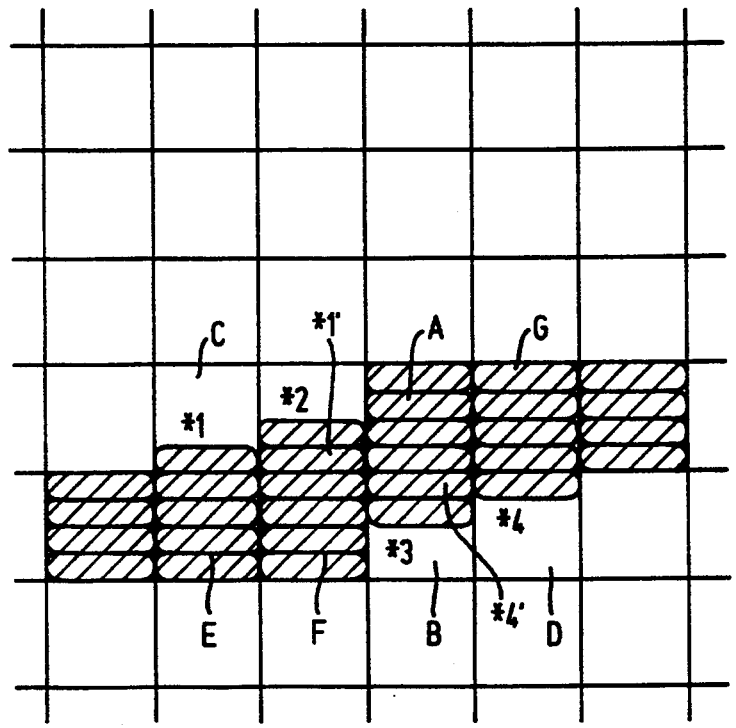
Figure 4A:
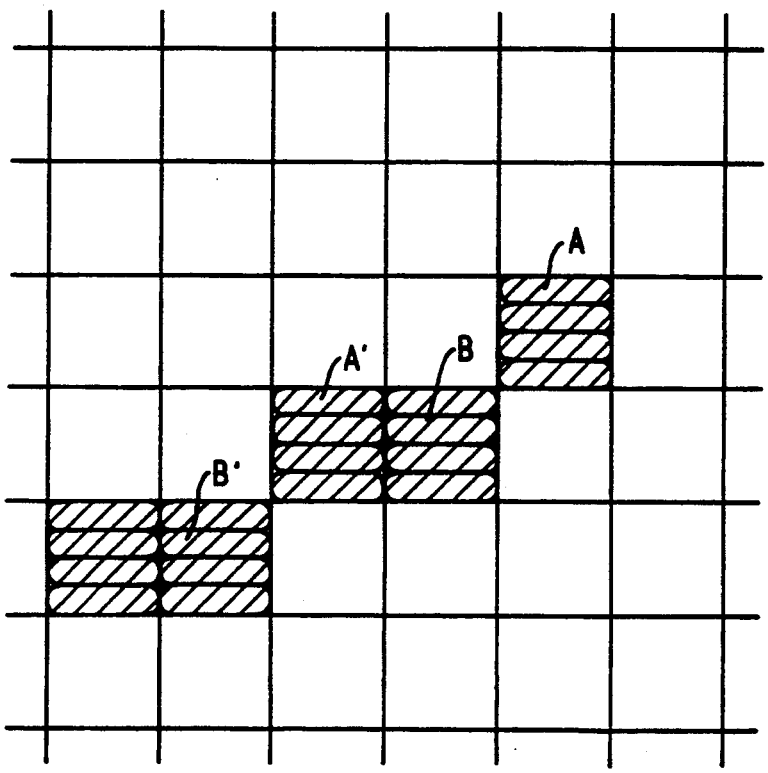
Figure 4B:
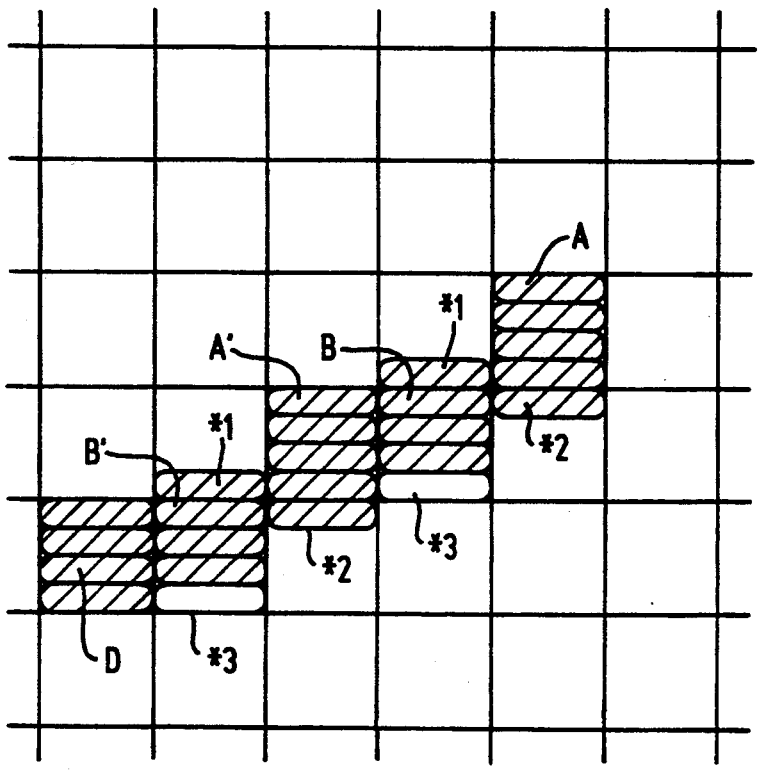
Figure 5:
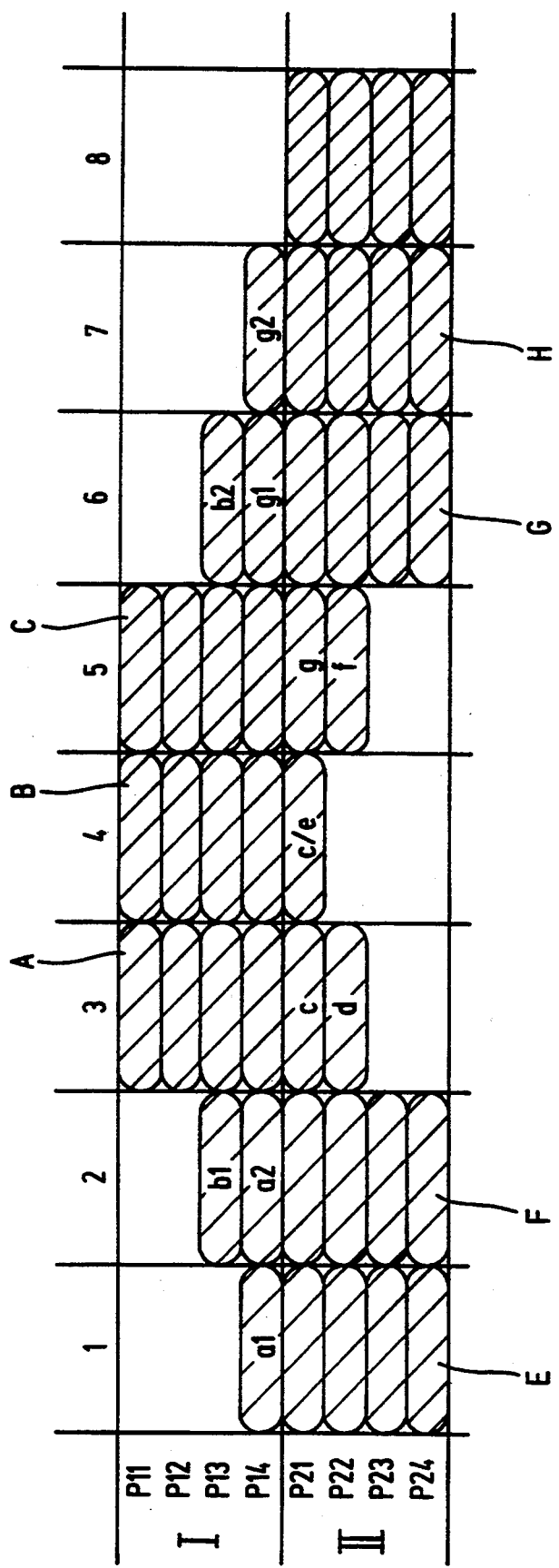

The reversion procedure is repeated up to (m)th RXm matrix for the first line p1, and then returns to the first n pixels of the second subpixel line P2, and so forth, until the fifth subpixels line P5 to accomplish the smoothing procedure for the first pixel line as shown in FIGS. 1 and 2.

Figure 13:
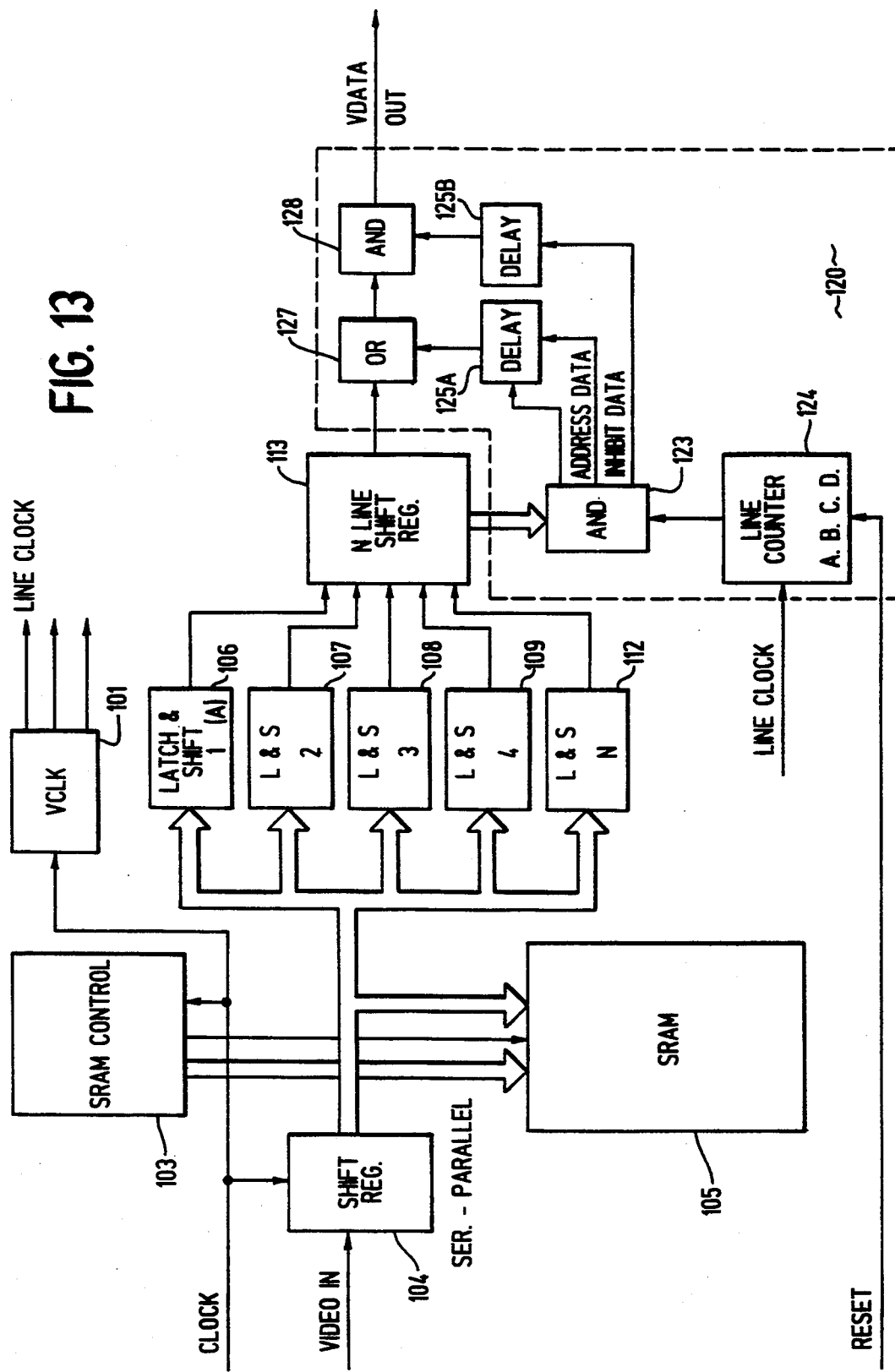
Figure 14:
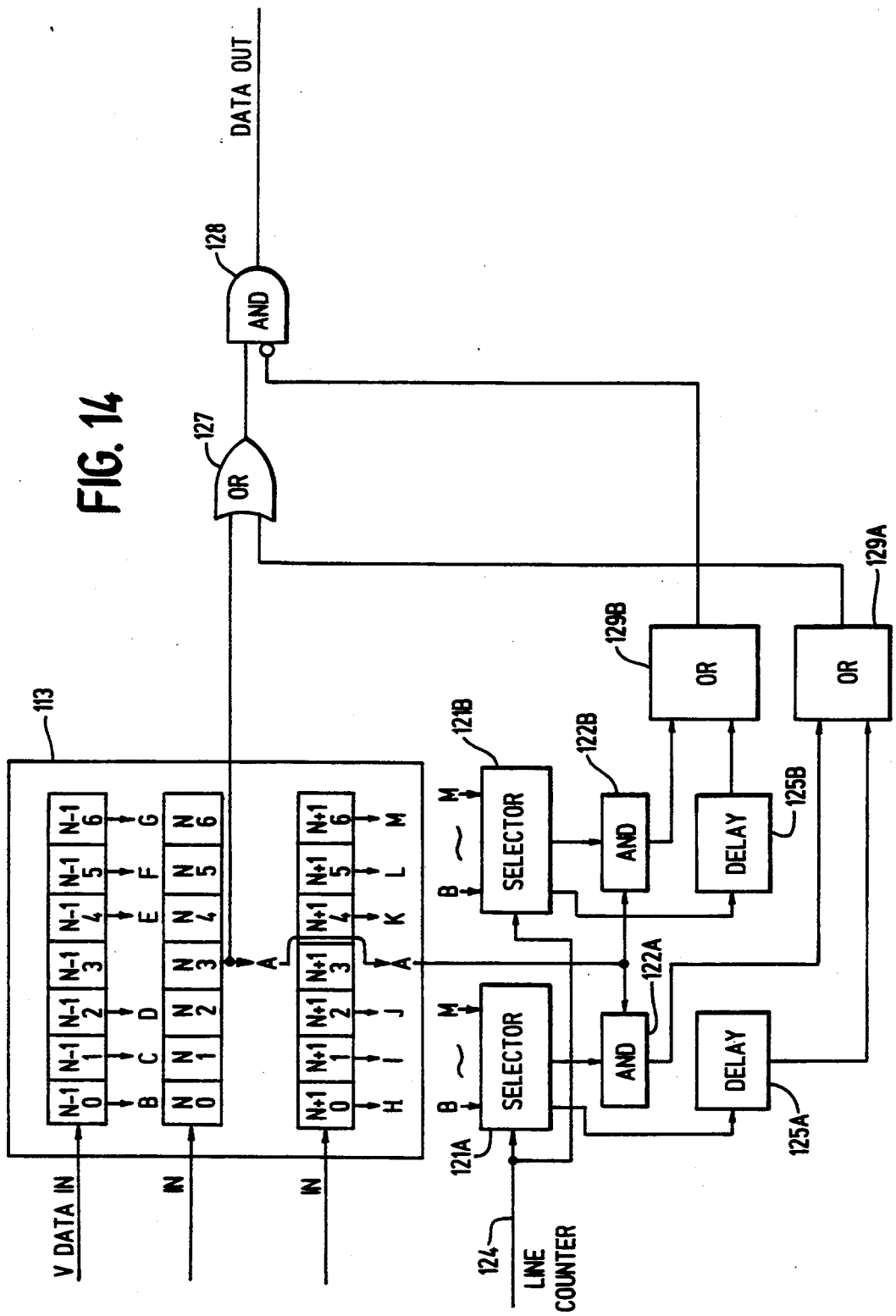

FIGS. 13 and 14 are illustrations of circuit block diagrams for the image smoothing according to an embodiment of the present invention for the second image smoothing procedure.

Referring to FIG. 13 illustrating the whole circuit block diagram, video data (VDATA) unfolded in an image random access memory (RAM) (not illustrated)

are transferred serially to a shift register 104 synchronizing with a video clock, (VCLK) signal generated in a VCLK 101, then, the VDATA are converted into N+1 bits of parallel data with the shift register 104, and the VDATA are stored in the first address of the first bank of a static RAM (SRAM) 105. The succeeding N+1 bits of converted parallel data are stored in the second address, repeating the same until the VDATA for the first scanning line are stored in the first bank of the SRAM 105.

Repeating the same procedure, VDATA for the second line are stored in the second bank, VDATA for the third line are stored in the third bank, and so forth.

All of VDATA for the N lines are stored in the 1st to (N)th banks of the SRAM 105. During the time for preparation of VDATA for the (N+1)th line to be stored in the first address of the (N+1)th bank of the SRAM 105, an SRAM control 103 reads sequentially the VDATA stored in the first address of the 1st to (N)th bank on receiving a latch signal, and stores that data in latches of latch & shift circuits 106, ..., 112. Following a signal from the SRAM control 103, the VDATA stored in the latches of the latch & shift circuits 106, ..., 112 are loaded into shift registers of the latch & shift circuits 106, ..., 112.

Repeating the same procedure, VDATA for the (N+1)th line are stored in the (N+1)th bank of the SRAM 105 synchronized with VCLK, and simultaneously to the above, VDATA for the 1st to (N)th lines stored in the SRAM 105 are transferred to latches of the latch & shift circuits 106, ..., 112, and then, VDATA in the shift registers of the latch & shift circuits 106, ..., 112 are loaded sequentially in an N line shift register 113.

When the SRAM 105 has stored the VDATA for the (N+1)th line in the (N+1)th bank, the SRAM 105 stores, following signals from the SRAM control 103, VDATA for the (N+2)th line in the first bank, VDATA for the (N+3)th line in the second bank, and so on until the 1st to (N)th banks are updated.

Finally, a pixel map (N×7) consisting of preceding and succeeding adjacent line(s), and 7 pixels including each three preceding and succeeding adjacent pixels is arrayed and stored in the N line shift register 113, as the VDATA transferred from the SRAM 105 updates sequentially the pixel map. Thus, with the pixel map. the image smoothing procedure in an image smoothing unit 120 is ready for boolean operation.

The image smoothing unit consists of selectors 121A and 121B for selecting the specific pixel, an AND logic 123 composed of AND logic 112A and 122B, a line counter 124 for selecting a subpixel line of the pixel, delay units 125A and 125B which subject vacant subpixel(s) to operate reversion, if there is a vacant subpixel(s) between the specific subpixel and the subpixel reversed by the boolean operation, a line counter for selecting the subpixel line, and an OR gate 127 and an AND gate 128 which subject the subpixel reversed to black to disjunction, or the subpixel reversed to white to conjunction, wherein the subpixel VDATA passed through the gates are sent serially to the LED head circuit.

Referring to FIG. 14, the procedure of the image smoothing unit 12 will be described. Firstly, the N line shift register 113 detects the specific pixel A where there is a shift from white pixels (0) to a black pixel (1); secondly, following line counter signals i through iv, the selectors 121A and 121B select reference pixel(s) bordering the specific pixel among the pixels B through M on the preceding scanning line P−1 and succeeding scanning line P+1, or in other words, select the reference pixel(s) among the bordering pixels B through G during the line counter signals i and ii, and among the bordering pixels H through M during the line counter signals iii and iv.

The specific and reference pixels are subjected to conjunction operation with the AND logics 122A and 122B to generate reversion signals as desired. If necessary as described above, with the reversion signal generated with the AND logics 122A and 122B, the delays 125A and 125B generate another reversion signal to form 2 bits sequential reversion signals to fill the vacant pixel.

Thus arranged subpixel signals are sent to the OR gate 127 and the AND gate 128 through the OR units 129A and 129B, wherein the arranged subpixel signals together with the video signals of the specific subpixel from the N line shift register 113 are subjected to boolean operation, disjunction in the OR gate 127 or conjunction in the AND gate 128, to achieve the image smoothing procedure. The smoothed subpixel VDATA are transferred serially up to the shift register 11 of the LED head array 1 shown in FIG. 10.

According to the embodiment of the invention, therefore, the procedure is so constituted to subject the specific and reference subpixel to conjunction operation that the image smoothing procedure can be done without a sophisticated circuit, with a simple processing, and with finer resolution.

Figure 15:
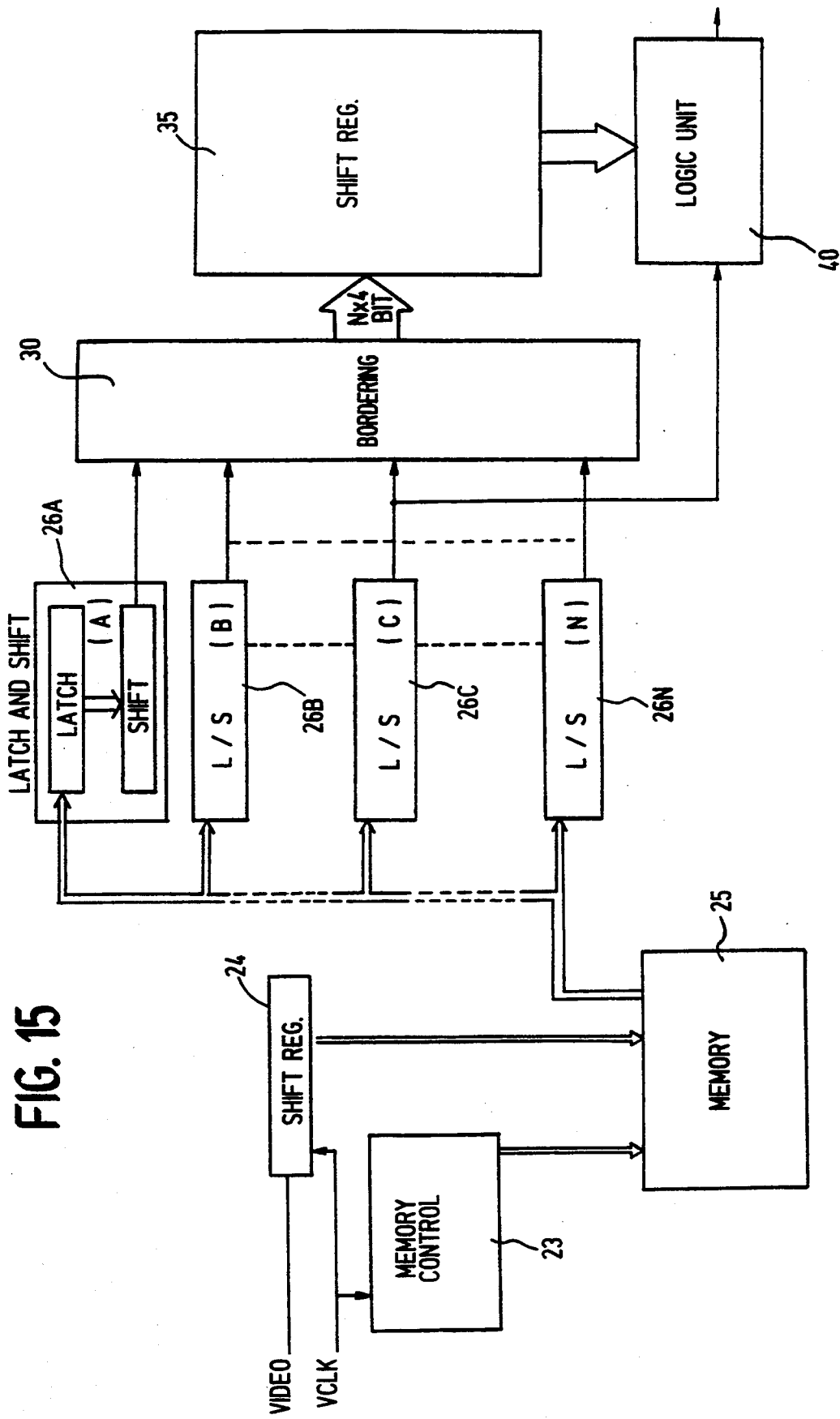
Figure 16:
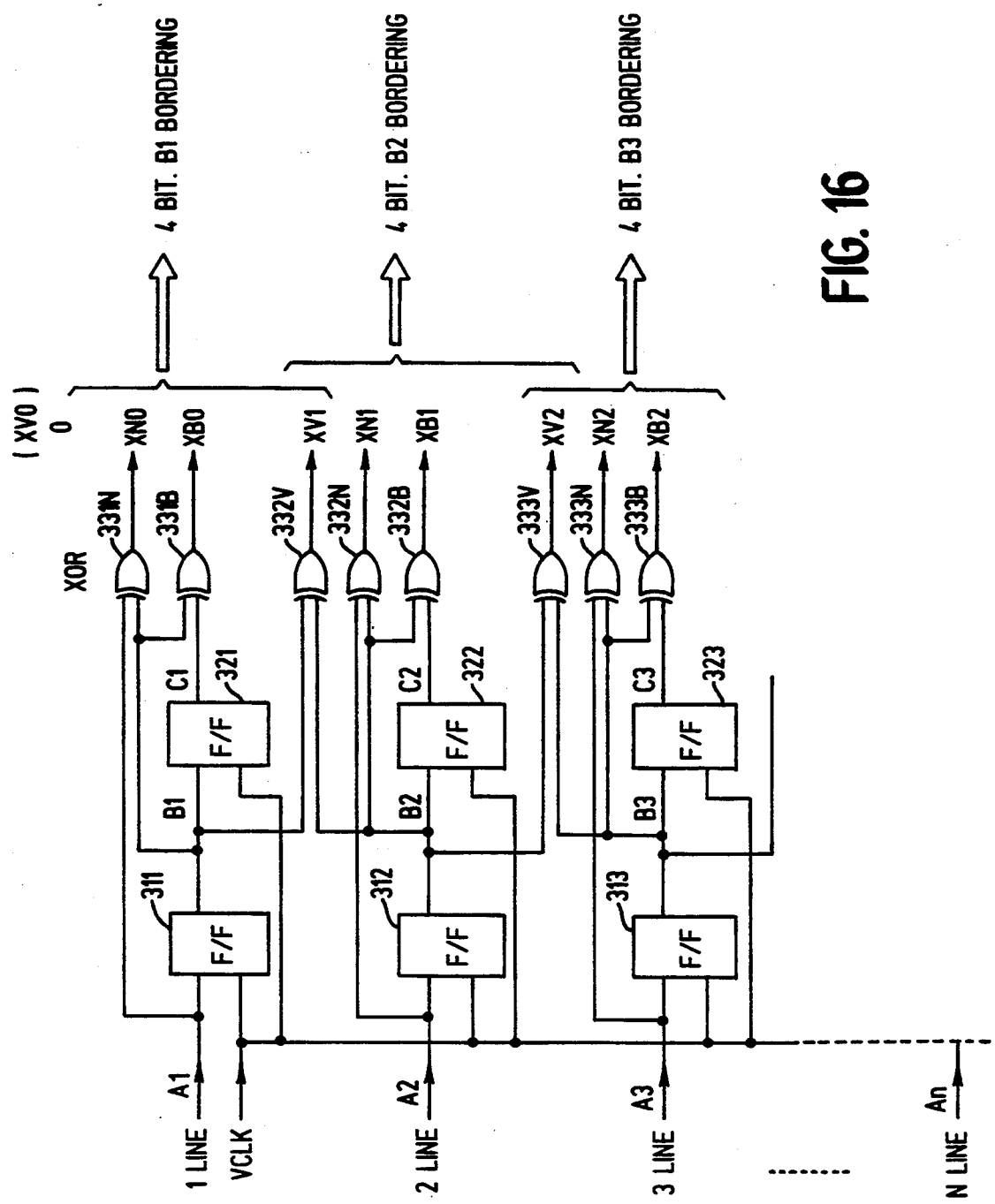
Figure 17:
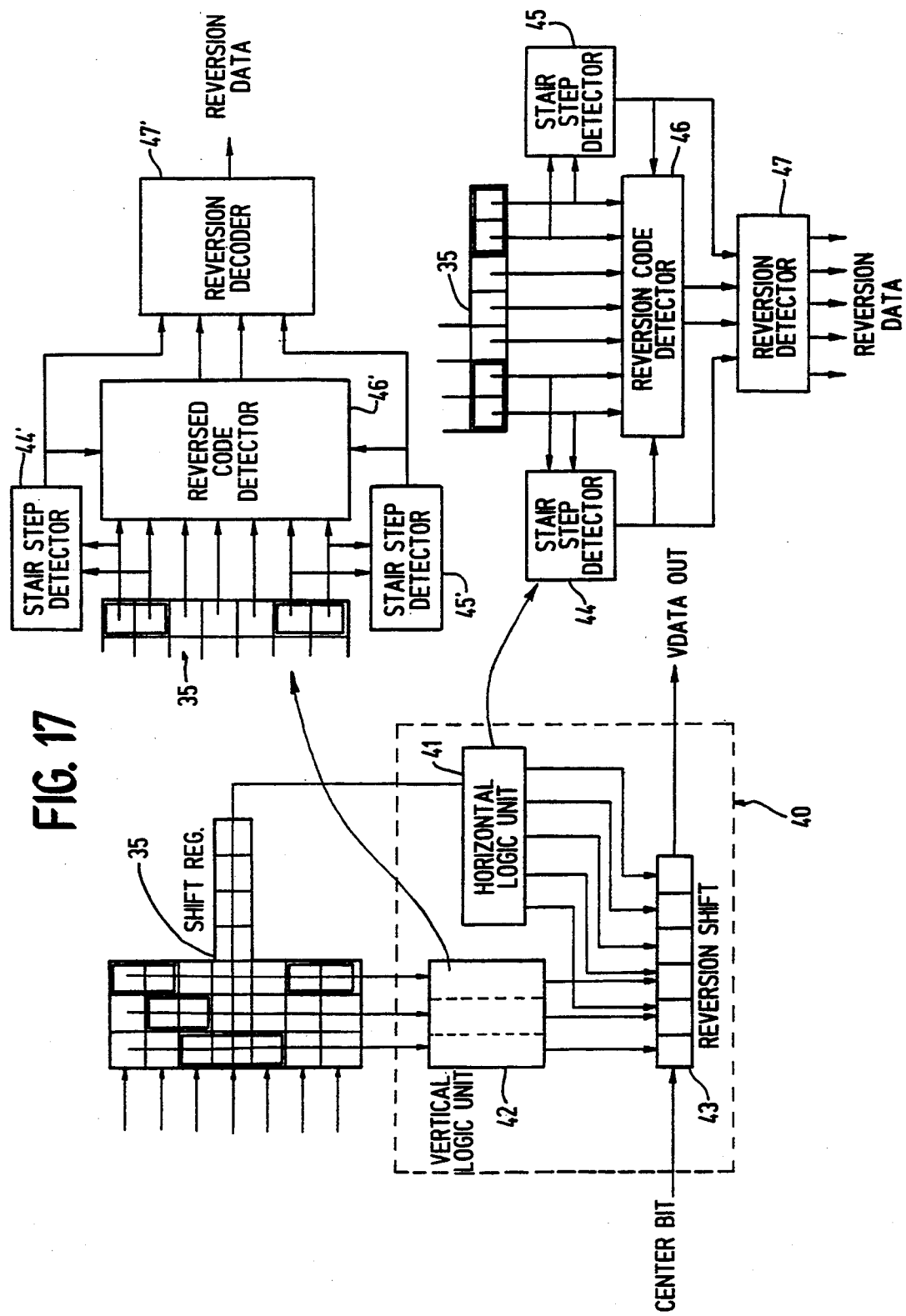

FIGS. 15 through 17 are illustrations of circuit block diagrams for the image smoothing describing an embodiment of the present invention for the third image smoothing procedure shown in FIGS. 6 through 9B; in which FIG. 15 illustrates the whole circuit block diagram; FIG. 16 illustrates a detailed circuit block diagram for the bordering data generator 30 shown in FIG. 15; and FIG. 17 illustrates detailed circuit block diagram for the boolean logic unit 40 shown in FIG. 15.

Referring to FIG. 15, VDATA unfolded in an image RAM (not illustrated) are transferred serially to a shift register 24 synchronized with a VCLK signal, the VDATA are converted into parallel data win the shift register 24, and the VDATA for a full line of the first scanning line are stored in the first bank of a SRAM memory 25. Repeating sequentially the same procedure, VDATA for the second line are stored in the second bank of the memory 25, VDATA for the third line are stored in the third bank of the memory 25, and so forth, wherein the all of VDATA for the N lines are stored in the 1st through (M)th banks of the memory 25. During the time for preparation of VDATA for the (N+1)th line to be stored in the first address of the (N+1)th bank of the memory 25, a memory control 23 reads sequentially the VDATA stored in the first address of the 1st through (N)th banks on receiving a latch signal, and stores the data in the latches of latch & shift registers 26A, ..., 26N. Following signals from the memory control 23, the VDATA stored in the latches of latch & shift registers 26A, ..., 26N are loaded into shift registers of the latch & shift registers 26A, ..., 26N.

Repeating the same procedure, VDATA for the (N+1)th line are stored in the (N+1)th bank of the memory 25 synchronized with VCLK, and simultaneously to the above, VDATA for the 1st through (N)th lines stored in the memory 25 are transferred to latches of the latch & shift registers 26A, ..., 26N, and then, the VDATA in shift registers of the latch & shift registers 26A, ..., 26N are loaded sequentially in a bordering data generator 30 synchronizing with VCLK.

Figure 6A:
Figure 6B:
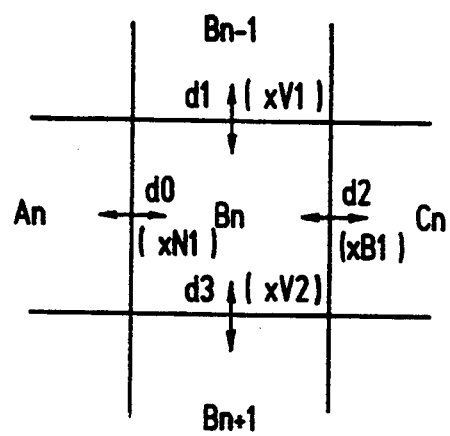
Figure 6C:
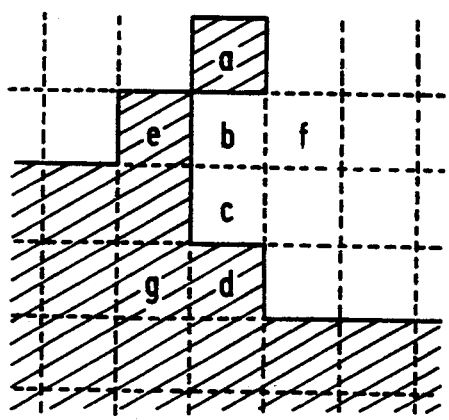

The bordering data generator 30, as shown in FIG. 16, consists of N pairs of bistable triggers or flipflops F/F311, ..., F/F31N, F/F321, ... F/F32N which shift the VDATA loaded from the X-OR gates 33 (331, ..., 33N) which subject the specific pixel and the bordering pixels to nonequivalence operation, or exclusive OR (E-OR in short) operation as shown in FIG. 6(a).

The procedure of the generator 30 will be that the VDATA loaded in the F/F312 of the first row are transferred to the F/F322 of the second row upon receiving each signal of the VCLK signals. The VCLK signals act on F/F's simultaneously to transfer the VDATA in the F/F322 to the X-OR gate 332B, as well. The potentials, therefore, in front of the F/F312, between the F/F312 and the F/F322, and at rear of the F/F322 correspond to the signals or logic values of preceding, the specific, and the succeeding pixels, that is, represent the states of A2, B2 and C2 pixels shown in FIG. 6(a).

The output signal XV1 of the X-OR gate 332V corresponds to the bordering data d1, a nonequivalence value with the pixel B1. The output signal XN1 of the X-OR gate 332N corresponds to the bordering data d0, a nonequivalence value with the pixel A2. Further, the output signal XB1 of the X-OR gate 332B corresponds to the bordering data d2, a nonequivalence value with the pixel C2. And lastly, the output signal XV2 of the X-OR gate 333V corresponds to the bordering data d3, a nonequivalence value with the pixel B3.

Thus, the four X-OR gates 332N, 332V, 332B and 333V generate four bits of the bordering data d0, d1, d2 and d3, the nonequivalence values between the specific pixel and the four bordering pixels. Because N pairs of bistable triggers F/F311, ..., F/F32N are constituted in the generator 30, the four bits of bordering data d0, d1, d2 and d3 are generated for N vertical pixel lines, and are transferred to the shift register 35 sequentially on each signal of VCLK.

The four bits of bordering data stored in the shift register 35 are shifted to the logic unit 40 together with the information of the specific pixel from the latch & shift register 26C to be subjected to the image smoothing procedure.

FIG. 17 shows detailed block diagrams of the logic unit 40, which includes a horizontal logic unit 41, a vertical logic unit 42 and a reversion shift register 43. The horizontal logic unit 41 receives any desired lines, 7 lines for example, of the bordering data d0, d1, d2, d3 stored in the shift register 35 for smoothing the stairstep types (1) to (4) shown in FIG. 7A, while the horizontal logic unit 42 receives the desired rows, 7 rows for example, of the bordering data for smoothing the stairstep types (5) to (8) shown in FIG. 7B. The reversion shift register 43 reverses the subpixels corresponding to the information generated by the logic units 41 and 42.

The horizontal logic unit 41 further includes: a first stairstep detector 44 for detecting the stairsteps (1) and (2) shown in FIG. 7A; a second stairstep detector 45 for detecting the stairsteps (3) and (4); a reversion code detector 46 for measuring the length of level pixels with respect to the detected stairstep, and for assigning pixel(s) with its reversion code referring to the reversion code table; and a reversion decoder 47 for assigning subpixel(s) to be reversed referring to the reversion data table.

The reversion decoder 47 has been installed with the reversion data table shown in FIG. 8(b) made of memories or random logics. The reversion decoder 47, hence, as previously described, is able to refer to the table with the type of stairstep ((1) or to (8)), and the reversion code (1 or 2) for assigning which of the subpixel(s) will be reversed.

Similar to the horizontal logic unit 41, the vertical logic unit 42 consists of a first stairstep detector 44' for detecting stairsteps (5) and (6), a second stairstep detector 45' for detecting stairsteps (7) and (8), a reversion code detector 46', and a reversion decoder 47', for which no further detailed procedures is described, as it works similarly to the horizontal logic unit 41.

From the latch & shift register 26C, the reversion shift register 43 receives serially the VDATA for one scanning line for four times repeatedly corresponding to the pixel division number of (four) subpixels. The VDATA stored in the reversion shift register 43 are reversed with the signals corresponding to the VDATA pixels from the logic units 41 and 42 for reversion as desired to be transferred to the LED head.

Referring to FIGS. 9A and 9B, the reversion procedure will be described as follows:

The VDATA shown in FIG. 9A (A) are transferred from the latch & shift register 26A, ..., 26N into the bordering data generator 30 which generates the bordering data d0, d1, d2, d3 to be stored in the shift register 35.

The logic unit 40 receives the bordering data d0, d1, d2, d3 stored in the shift register 35, and the corresponding pixels to be modified from one of the latch & shift registers, 26C for example. The stairstep and its type are detected with the stairstep detector 44, 45 analyzing the bordering data d0, d1, d2, d3.

In the event when a stairstep(s) is detected, the reversion code detector 46 measures the length of level pixels as shown in FIG. 9A (C), and then assigns the pixel(s) with the reversion code referring to the reversion code table with the type of stairstep and the length of level pixel as shown in FIG. 9B (A).

On receiving the type of stairstep and the reversion code, the reversion decoder 47 assigns which part of the subpixel(s) will be reversed referring to the reversion data table, and then outputs the reversion signals to the reversion shift register 43 as shown in FIG. 9B (B).

Lastly, the pixels in the reversion shift register 43 are subjected to reversion procedure conducted with the reversion signals from the reversion decoder 47 as shown in FIG. 9B (C).

What is claimed is:

1. A method for forming a smoothed image on an area composed of a plurality of rows of pixels, the rows extending in a first direction and being offset from one another in a second direction perpendicular to the first direction, the image being formed under control of a data signal having a plurality of pixel signal elements, each pixel signal element being associated with a respective pixel and being assigned a value which is one of a first value indicating that the respective pixel is to contain a visible dot and a second value indicating that the respective pixel is to be left blank, said method comprising:

dividing each pixel into a plurality of subpixels so that the subpixels are offset from one another in the one of the first and second directions and have the same dimension as the pixel in the other one of the first and second directions;

deriving from the data signal a plurality of subpixel signal elements, each subpixel signal element being associated with a respective subpixel of a respective pixel and each subpixel signal element having a value which is one of a first value indicating that the respective subpixel is to contain a visible dot and a second value indicating that the respective subpixel is to be left blank, wherein said step of deriving is performed by comparing the pixel signal element value of a selected pixel with the pixel signal element values of pixels adjacent the selected pixel, to produce a first comparison result when the values of the subpixel signal elements for the selected pixel are to be based solely on the pixel signal element for the selected pixel and a second comparison result when the value of at least one subpixel signal element for the selected pixel is to differ from the value based solely on the pixel signal element for the selected pixel, and, when the second comparison result is produced for the selected pixel, assigning to at least one subpixel signal element associated with a subpixel of the selected pixel a value opposite to the value of the pixel signal element associated with the selected pixel; and forming the smoothed image on the basis of the subpixel signal element values obtained in said deriving step.

2. The method as defined in claim 1 wherein the image is formed on a sheet by an LED printer having a print head while the sheet advances in the second direction, and the one of the directions in which each pixel is divided into subpixels is the second direction.

3. The method as defined in claim 1 wherein the image is formed by a printer of a given type and the direction in which each pixel is divided into subpixels is dependent on the printer type.

4. The method as defined in claim 1 wherein a border exists between every two adjacent pixels and the at least one subpixel whose subpixel signal element is assigned an opposite value is located adjacent a border of one pixel so that a dot which would be provided in a pixel at one side of the border by the pixel signal elements appears to be shifted or varied in size due to the assigning of an opposite value to the subpixel signal element.

5. The method as defined in claim 4, wherein each pixel is divided into P subpixels and when the pixel signal element for one pixel has the first value and the first comparison result has been produced for the one pixel, said step of forming comprises forming a dot in N selected subpixels of the one pixel, where $N<P$.

6. The method as defined in claim 4 wherein said step of comparing comprises performing at least one logical conjunction between the value of the pixel signal element of the selected pixel with the value of the pixel signal element of at least one pixel which is adjacent the selected pixel.

7. The method as defined in claim 6 wherein said step of comparing further comprises performing at least one logical disjunction between the value of the pixel signal element of the selected pixel with the value of the pixel signal element of at least one pixel which is adjacent the selected pixel.

8. The method as defined in claim 6 wherein when said comparison step produces the second comparison result, said step of assigning further includes assigning a value opposite to the value determined by the pixel signal element associated with the selected pixel to the subpixel signal element of any subpixel of the selected pixel for which the subpixel signal element has been given an opposite value and the adjacent pixel.

9. The method according to claim 1 wherein: each pixel is bordered by two border pixels in the first direction and two border pixels in the second direction and said step of comparing comprises deriving binary border data for each pixel; the border data for any given pixel includes a plurality of binary data elements each representing the relation between the value of the pixel signal for the given pixel and the value of the pixel signal for a respective border pixel bordering the given pixel; each binary data element has a first binary value when the values of the pixel signal elements for the given pixel and the respective border pixel are the same and a second binary value when the values of the pixel signal element for the given pixel is different from the value of the pixel signal element for the respective border pixel; and said step of comparing utilizes the binary border data.

10. The method as defined in claim 9 wherein the pixel signal elements define an image stairstep when, in a given direction, a plurality of successive pixel signal elements having the first value adjoin a plurality of successive pixel signal elements having the second value, and an image stairstep is of a given type determined by whether the given direction is the first direction and the order of the first and second pixel signal elements in the given direction, and wherein said step of assigning is performed with at least one subpixel of a selected pixel represented by a pixel signal element forming part of an image stairstep and located adjacent a border with a pixel represented by a pixel signal element value opposite to the pixel signal element value of the selected pixel.

11. The method as defined in claim 10 wherein the border data for any given pixel is composed of four data bits each obtained as an exclusive-OR function of the value of the pixel signal element for the given pixel and the value of the pixel signal element of a respective border pixel bordering the given pixel.

12. The method as defined in claim 10 wherein the location and type of an image stairstep are determined as a function of border data for each of a plurality of pixels adjacent a given pixel.

13. The method as defined in claim 10 wherein said step of assigning is performed on the basis of pixel codes provided in a pixel code table, each pixel code being associated with a respective number of successive pixel elements having one value in an image stairstep and on the basis of the type of image stairstep.

14. The method as defined in claim 13 wherein the image is formed by a printer of a given type and said step of assigning is performed in a manner determined by the printer type.

* * * * *